United States Patent [19]

Kibbe et al.

[11] Patent Number: 5,787,353
[45] Date of Patent: Jul. 28, 1998

[54] PROCESS FOR THE IN SITU RECOVERY OF CHEMICAL VALUES FROM UF 6 GASEOUS DIFFUSION PROCESS EQUIPMENT

[75] Inventors: Keith Kibbe, Knoxville, Tenn.; Aarne Visnapuu, Rolla, Mo.; Wilbur L. Kephart, Farragut, Tenn.

[73] Assignee: Southeastern Technologies, Inc., Knoxville, Tenn.

[21] Appl. No.: 622,261

[22] Filed: Mar. 26, 1996

[51] Int. Cl.$^6$ ........................................ C01G 57/00
[52] U.S. Cl. ................ 423/19; 423/149; 423/258; 134/2; 134/30; 376/309; 976/DIG. 376
[58] Field of Search .............. 423/19, 149, 258; 376/309; 976/DIG. 376; 134/30, 2

[56] References Cited

U.S. PATENT DOCUMENTS

| | | | |
|---|---|---|---|
| 2,743,168 | 4/1956 | Krohn et al. | 23/264 |
| 2,750,253 | 6/1956 | Smith | 23/14.5 |
| 2,830,873 | 4/1958 | Katz et al. | |
| 2,835,557 | 5/1958 | West et al. | 23/203 |
| 2,855,271 | 10/1958 | Libby | 23/14.5 |
| 3,498,749 | 3/1970 | Aldridge | |
| 3,672,873 | 6/1972 | Huggins et al. | |
| 3,825,650 | 7/1974 | Gustison et al. | |
| 3,925,536 | 12/1975 | Schuman | 423/258 |
| 4,045,541 | 8/1977 | Mercer | 423/417 |
| 4,311,678 | 1/1982 | Jacob et al. | 423/19 |
| 4,364,906 | 12/1982 | Jones et al. | 423/19 |
| 4,434,139 | 2/1984 | Bacher et al. | 423/19 |
| 4,522,794 | 6/1985 | Hochel et al. | 423/251 |
| 5,431,891 | 7/1995 | Crabriac et al. | 423/19 |

FOREIGN PATENT DOCUMENTS 455227  6/1891  United Kingdom.

OTHER PUBLICATIONS

E.B. Munday; Preconceptual Design of the Gas–Phase Decontamination Demonstration Cart; Dec. 1993.

E.B. Munday and D.W. Simmons; Feasibility of Gas–Phase Decontamination of Gaseous Diffusion Equipment; Feb. 1993.

*Primary Examiner*—Ngoclan Mai
*Attorney, Agent, or Firm*—Paul E. Hodges, P.C.

[57] ABSTRACT

A process for the recovery of chemical values, particularly uranium, nickel and/or radionuclides from process equipment theretofore employed in a uranium hexafluoride isotope enrichment cascade. Preferably, the process is carried out, in situ, at subatmospheric pressure employing the existing process equipment from which the chemical values are to be recovered. In one aspect, the process includes recovery of uranium values employing a gaseous fluorinating agent at subatmospheric pressure, followed by recovery of nickel values employing a gaseous reactant comprising a mixture of carbon monoxide and a promoter, preferably hydrogen sulfide and at subatmospheric pressure.

35 Claims, 3 Drawing Sheets

PROCESS FOR THE IN SITU RECOVERY OF CHEMICAL VALUES FROM UF 6 GASEOUS DIFFUSION PROCESS EQUIPMENT

FIELD OF INVENTION

The present invention relates to the recovery of chemical values, particularly uranium, nickel and/or other chemical values from process equipment theretofore employed in a uranium hexafluoride isotope enrichment plant.

BACKGROUND OF INVENTION

There exist several sites where the U.S. Government has, in years past, conducted isotope enrichment of uranium hexafluoride employing a gaseous diffusion process. In this process, uranium (U-238, U-235, U-234) hexafluoride gases along with small quantities of sundry other radionuclide gases are caused to flow through a series of diffusion barriers arranged in a cascade. The U-235 and U-234 isotopes preferentially pass through the barriers and proceed toward the top of the cascade, while the heavier U-238 isotope is preferentially contained by the barriers and proceeds toward the bottom of the cascade. Trace radionuclides present may proceed in either direction, depending upon the diffusion characteristics of each radionuclide. Provisions are made to remove the trace radionuclides and other non-radioactive contaminates which proceed toward the top of the cascade in order not to contaminate the U-235 product. A fraction of the heavier trace radionuclides present which proceed toward the bottom of the cascade are removed with the U-238 waste stream.

In this process, the equipment employed includes many very large steel containment vessels, connected in series and which contains nickel in the barrier. The process also contains various other types of equipment, such as pumps, valves, piping, etc., all of which have been exposed to the uranium hexafluoride gas stream. In the present application, the term "cell" is used generically at times to identify a small unit of the cascade which includes all the process equipment normally associated with the cascade, such as barrier containment vessels, barrier, pumps, valves, piping, etc., unless the context indicates otherwise. For purpose of brevity or otherwise, at times the term "cell" may be used herein interchangeably with the term "process equipment".

As noted hereinabove, the process equipment employed in the processing of gaseous uranium hexafluroride, over time, is known to have built up deposits of uranium-containing compounds such as various uranium oxides and uranyl fluoride ($UO_2F_2$) as a result of the inleakage of moist ambient air into the equipment containing uranium hexafluoride. Also the solid compounds $UF_4$ and $UF_5$ were formed over time by fluoride ion exchange between $UF_6$ and internal metal surfaces. For various reasons, minor quantities of other trace radionuclides become attached to and\or are embedded in the exposed metal, or solidified uranium deposits interiorly of the process equipment. Over time, in a shut-down (deactivated) plant which housed this gaseous diffusion process, the accumulation of these trace radionuclides can represent a potential environmental and/or worker hazard if not properly processed. In this regard, technetium-99 is a currently recognized concern, but it is recognized that these trace contaminants may include other fission products and their daughter decay products and transuranic nuclides and their daughter decay products.

The large containment vessels and other items of process equipment are also known to be coated internally with a layer of nickel which is intended to protect the steel shells of the vessels from corrosive attack by the gaseous uranium hexafluoride gas stream, other gases such as $F_2$, and/or the reaction products thereof. Further, it is known that the diffusion barriers of this process equipment contain significant amounts of nickel.

One or more of the uranium hexafluoride isotope enrichment facilities which have been constructed within the United States remain functional. Many of these facilities, however, have been "moth-balled", i.e. shut down, over the last several years, some for many years. The process equipment in these moth-balled facilities remains intact, however. That is, the equipment previously used in the isotope enrichment process remains in place and remains substantially functional. In some instances, the large containment vessels and the accompanying equipment of a cascade has been backfilled with an inert gas. This factor is of importance to one aspect of the present invention as will appear more fully hereinafter.

The mere continued existence of the large volume of process equipment which is now obsolete, in its contaminated condition, and the space which it occupies, has become a serious problem from several aspects. The contaminated nature of the process equipment requires that it be isolated from the public. The large buildings which house the in-place process equipment can not be used for other and productive purposes. The cost of maintaining the buildings, the grounds, and the process equipment itself is enormous. Unfortunately, heretofore, there has been no known economically acceptable alternative presented for alleviating this situation, which is fast growing worse.

In operating gaseous diffusion plants, chlorine trifluoride has been used in certain instances heretofore for removing bulk deposits of uranium compounds from the process equipment. In all known instances the chlorine trifluoride gas concentrations and the exposures of the chlorine trifluoride to the uranium deposits has been kept low with the intent to merely reduce deposits to the extent necessary to alleviate specific operational and maintenance problems, while avoiding excessive corrosion of interior surfaces of the equipment. Obsolete, damaged or worn-out process equipment, associated with routine plant maintenance, has heretofore been treated using aqueous technologies to remove uranium-containing deposits from the equipment. This has involved, and continues to involve, disassembly of the equipment, movement of the equipment offsite, and washing with dilute acid sprays in a special-purpose external facility. Special precautions are required for worker radiation protection and criticality control, and these methods tend to produce significant amounts of secondary wastes. Consequently application of these technologies is costly. In these operations, no particular effort is known to have been taken to recover the metal or other chemical values associated with the process equipment, with a view to its reuse.

Decommissioning of what has now become obsolete gaseous diffusion process equipment has become a major problem. The sheer volume of both the process equipment and the contaminating uranium-containing compounds known to exist interiorly of the process equipment, in addition to the potential dangers associated with the handling of uranium-containing compounds (some of which are highly enriched in U-235) and/or other materials, such as $^{99}Tc$, from the human safety and from the critical mass aspect of enriched uranium, have deterred conventional salvage methodologies.

It is to be recognized that even if one is successful in removing uranium-containing compounds from the obsolete process equipment, there remains the problem of recovery of the metals from which the equipment is fabricated, some of which are present in vast quantities and quite valuable. In particular, a very large amount of nickel, primarily in the barrier material, is known to be present in the "moth-balled" gaseous diffusion plants. This nickel may be measured in tens of thousands of tons. Consequently, it is highly desirable to recover this nickel. The only known prior attempt at recovering the large quantities of nickel in the gaseous diffusion equipment includes disassembly of the contaminated equipment and removal of uranium-containing compounds from the surfaces of the disassembled equipment, using aqueous procedures, followed by melting of the equipment, to develop ingots of the metals. The intent here being to merely reduce the bulk of the equipment so as to minimize the area required for storage. The cost of this process, including storage however, far outweighs the market value of the nickel, steel, aluminum. In addition the remaining contaminants such as technetium-99 became homogeneously dispersed throughout the metal ingots which lowers their market value.

The vastness of the problem of recovering chemical values from the obsolete gaseous diffusion plant process equipment is difficult to portray. However, it is known that the cascades cover hundreds of acres of plant area—the K-25 Building at the Oak Ridge, Tenn. K-25 facility site alone is over one mile long, and is only one of five such process buildings on the K-25 plant site. The recovered metals from the existing gaseous diffusion plants are very valuable, but only if they can be recovered at a proper cost and free of contaminating quantities of radioactive materials, uranium- containing compounds, for example, or other contaminants. The complexity of the problem is emphasized by the nature of some of the process equipment, especially the barrier material where the porosity of the barrier has provided harbors for uranium values and/or relatively smaller quantities of hazardous materials such as technetium.

Any process for the recovery of the metal values(and/or other chemical values) from the gaseous diffusion process equipment must take careful consideration for safeguarding nuclear materials, security, criticality safety, minimizing production of secondary wastes, and reducing equipment handling requirements. Stringent health physics and industrial hygiene requirements also must be met in performing all recovery operations.

Thus, it is readily recognized that conventional concepts are not cost effective and therefore are not amenable to the task of recovering uranium, nickel and/or other chemical or metal values from gaseous diffusion process equipment. On the other hand, if a cost effective recovery process were available, the value of the process would be almost inestimable. As used herein, the term "chemical values" is at times used in a generic sense as including one or more chemical elements (which includes any member of the periodic table), and one or more chemical compounds, any of which may be present in either a gaseous, solid or liquid state. At times, the term "chemical values" is combined with the term "metal" or "metals" to emphasize the fact that the values being referenced include chemical compounds, often gaseous, and one or more metals.

Heretofore, laboratory scale experiments have been conducted under the auspices of the U.S. Department of Energy which have demonstrated that exposures of uranium-contaminated sample items from gaseous diffusion plant process equipment to chlorine trifluoride for long periods of time (e.g. 30 to 90 days), at subatmospheric pressure, ambient temperatures, and significantly higher concentrations than previously used during routine plant maintenance operations, are capable of removing the existing uranium deposits to a degree sufficient to certify the items to be sufficiently free of uranium-containing compounds as to permit the items to be declared "noncontaminated" with respect to uranium. One or more of the present inventors have participated in a study intended to lead to a field-scale trial directed to the in situ removal of uranium-containing compounds from the process equipment associated with a gaseous diffusion plant. To the knowledge of the present inventors, these studies have not been directed toward, nor have they involved in any way, the in situ recovery of other chemical or metal values from the process equipment. In particular, these studies have neither suggested nor disclosed a process or process step relating to the recovery of nickel.

It is therefore an object of the present invention to provide a process which is capable of cost effectively recovering, in situ, chemical values from process equipment theretofore employed in a uranium hexafluoride isotope enrichment gaseous diffusion plant.

It is another object of the present invention to provide a process for the recovery of chemical values from the process equipment theretofore employed in a uranium hexafluoride isotope enrichment gaseous diffusion plant which renders the process equipment otherwise suitable for conventional salvage techniques.

It is another object of the present invention to provide a process for the cost effective recovery of uranium, nickel and/or technetium values from the process equipment theretofore employed in a uranium hexafluoride isotope enrichment gaseous diffusion plant.

It is another object of the present invention to provide an in situ process for the recovery of rogue radionuclide contaminates from the internal surfaces of the process equipment to levels below the "free release" radioactivity values.

BRIEF DESCRIPTION OF THE DRAWINGS

Other objects and advantages of the present invention will be recognized from the description contained herein, including the claims and drawings in which:

SUMMARY OF INVENTION

In accordance with one aspect of the present invention, the recovery of chemical values, particularly uranium, nickel and/or technetium values, from process equipment theretofore employed in a uranium hexafluoride isotope enrichment cascade is accomplished in situ, that is, using the preexisting process equipment itself in carrying out the recovery process. The present process incorporates the conversion of the uranium-containing compounds found on the interior surfaces of the equipment to gaseous uranium hexafluoride through the reaction therewith of a gaseous fluorinating agent that is capable of converting at least uranium oxide and/or uranyl fluoride to at least gaseous uranium hexafluoride at a temperature of between 15° C. and 65° C. and at subatmospheric pressure, for example flourine gas or a gaseous halo-fluoride, such as chlorine triflouride, by means of flowing the gaseous fluorinating agent into the interior of the equipment, initially at ambient temperature, and at subatmospheric pressure, while the interior of the equipment is coated with nickel. The gaseous uranium hexafluoride so formed is captured exteriorly of the process equipment as uranium hexaflouride or may be converted to uranium metal, as desired. Thereafter, in accordance with a further aspect of the present invention, gaseous carbon monoxide, in the presence of a selected quantity of a gaseous promoter, such as hydrogen sulfide, is flowed into the process equipment, initially at ambient temperature, and at subatmospheric pressure, i.e., less than one atmosphere to convert the nickel to gaseous nickel carbonyl in situ to develop a process stream of gaseous nickel carbonyl and carbon monoxide. Thereafter, the nickel carbonyl in the process stream is converted to metallic nickel exteriorly of the equipment. The nickel carbonyl to nickel conversion process liberates the gaseous carbon monoxide which is thereupon available for recirculation as a process gas stream or redirection into other of the process equipment.

Employing the present process and employing the existing engineered gas-tight process equipment, and while the equipment is still protected by the nickel coating on the interior of the equipment, the uranium values are recovered, in situ and thereafter, the nickel values associated with the same process equipment, are recovered, in situ, by converting the nickel on the interior of the process equipment, including the nickel associated with the barrier material, to gaseous nickel carbonyl at subatmospheric pressure and at a temperature, and in the presence of a selected quantity of a gaseous promoter, such as hydrogen sulfide, wherein the gaseous carbon monoxide does not materially attack the underlying steel of the process equipment.

In accord with one aspect of the present method, the temperature of the input stream of carbon monoxide and promoter gases preferably is initially at ambient temperature, i.e., about 30° to 40° C. It is acceptable for the temperature of the gas stream within the cell to rise, but not higher than the temperature at which nickel carbonyl decomposes, i.e., about 150° C. Further, inasmuch as the nickel to nickel carbonyl conversion process is exothermic and the pressure within the interior of the process equipment is to be maintained subatmospheric, among other reasons, because nickel carbonyl is highly toxic and can not be allowed to escape from the closed system of the present invention, the temperature within the process equipment can not be allowed to rise above that temperature where the heated gases within the process equipment exceeds that temperature where the pressure of the gases within the process equipment no longer is subatmospheric.

In the course of subjecting the process equipment to the carbon monoxide/hydrogen sulfide gas treatment, this gas mixture penetrates the pores of the barrier material in the cell and is available to carbonylate various chemical species found in these pores, including the nickel and/or radionuclides, such as technetium. Also, as the nickel of the barrier material is carbonylated, technetium and/or similar deposits of trace radio-nuclides within the barrier pores become exposed and available for carbonylation. Gaseous technetium carbonyl is carried out of the cell with the more voluminous nickel carbonyl gas and is recovered exteriorly of the cell.

Notably, the present inventors have discovered a combination of steps which may be employed to effect removal and recovery of a multiplicity of diverse chemical values from the process equipment. Each added reactant is gaseous and is specific for at least one chemical value found interiorly of the process equipment. Each added reactant converts its specific chemical values to gaseous products that are readily removable from the interior of the process equipment where they can be captured using known techniques. Further, the steps of the process, in a preferred embodiment, follow one another in sequence, with subsequent steps benefitting from the results of one or more of the previous steps of the process.

In accordance with one aspect of the present invention, it is important and preferred that the recovery of the uranium values from the process equipment be effected prior to the steps of the process relating to the recovery of the nickel, for at least two reasons. First, the presence of the nickel coating on the interior of the process equipment protects the underlying steel from corrosive attack by the halo-fluoride gas employed in the uranium value recovery steps. This coating is removed by the nickel recovery steps so that the nickel recovery steps must be carried out after the halo-fluoride and/or uranium hexafluoride gases have been removed from the cell. Second, the uranium recovery steps remove uranium-containing deposits from the interior surfaces of the process equipment, thereby exposing the nickel metal surfaces within the interior of the process equipment, and maximizing the availability of the nickel to exposure to the carbon monoxide/promoter gas stream. For similar reasons, the uranium is removed before final removal of residual radionuclide contaminates.

As a benefit offered by the present process, both the uranium recovery steps and the nickel recovery steps contribute to the recovery of other chemical values, such as technetium. In the uranium recovery steps, the chlorine trifluoride gas removes, in the form of sundry chloride-fluoride gases, a portion of the technetium-99, and other trace radionuclide nuclide contaminants, that reside within the uranium-containing deposits on the interior surfaces of the process equipment, and/or on the interior surfaces of the process equipment, including within the barrier material. These extraneous gases are carried out of the cell with the uranium hexafluoride gas whereupon the uranium hexafluoride gas is separated by conventional means and trace radionuclide contaminants are captured by preferential sublimation or adsorption in one or more traps, each operating under conditions that are specific for a given one, or plurality, of trace contaminants.

In the nickel recovery steps, other portions of trace radionuclides, such as technetium-99, which remain within the interior of the process equipment following the uranium recovery steps, are subjected to carbonylation by the carbon monoxide and a promoter such as hydrogen sulfide to form various gas(es) that are carried out of the cell along with the nickel carbonyl (and carbon monoxide/promoter gas). The trace contaminant gas(es) are separated from the nickel carbonyl gas (and carbon monoxide/promoter gas) and captured as described herein. Alternatively, as required, following the recovery of the nickel from the interior of the process equipment, an additional quantity of carbon monoxide, with or without a promoter, may be introduced to the interior of the process equipment for the specific purpose of carbonylation of further, and remaining, quantities of trace contaminants. Gases thus formed are recoverable as described herein.

Importantly, and unexpectedly, the speed of the conversion reaction is strongly enhanced at selected molar ratios of hydrogen sulfide to carbon monoxide under the conditions of temperature and subatmospheric pressure employed in the present invention. Also, it appears likely that, under the operating parameters of the present invention, the selected molar ratios of hydrogen sulfide to carbon monoxide may aid in reducing the likelihood of carbon monoxide effecting undesirable significant attack of metals, other than nickel, e.g., steel, found in the process equipment. This selectivity of the combination of carbon monoxide and hydrogen sulfide gases in carbonylating nickel metal is unexpected in that it is known that carbon monoxide readily carbonylates iron and many other metals, particularly in the presence of a promoter, and prior to the present discovery, would have been suspected to materially carbonylate the steel in the process equipment, especially after the protective nickel coating was removed therefrom. Such attack on the steel, for example, has not been found to occur under the operating conditions claimed in the present invention. The effectiveness or the present process in carbonylation of the technetium in the course of the nickel carbonylation activities represents an unexpected desirable means for recovery of technetium from the process equipment.

Selectivity of the chemical reactions within the interior of a cell is important to the present invention in that it is anticipated that the present process will require several days or months of treatment of each cell, depending upon the existing condition of each of the hundreds of cells now in existence, to effect the desired removal of the uranium values, followed by recovery of the nickel and/or rogue radioactive contaminate values from the cell. Without this selectivity of reaction, the recovery process can become overly burdened, and possibly rendered ineffective, by the simultaneous recovery of chemical values which are foreign to the uranium, nickel and/or trace radionuclide contaminants, (e.g. technetium values).

Inasmuch as a significant portion of the uranium and/or technetium chemical values may be found in the pores of the diffusion barrier employed in the cascades, the present process serves to reach even into these pores to effect the desired removal of uranium and/or technetium values therefrom. Further, the present process, by reason of its ability to penetrate the pores of the barrier material with a reactant gas stream, provides access to the nickel that defines the pores themselves. Therefore, as nickel metal within the pores is removed, the pores become larger and admit even more gaseous reactant.

DETAILED DESCRIPTION OF INVENTION

Figure 1:
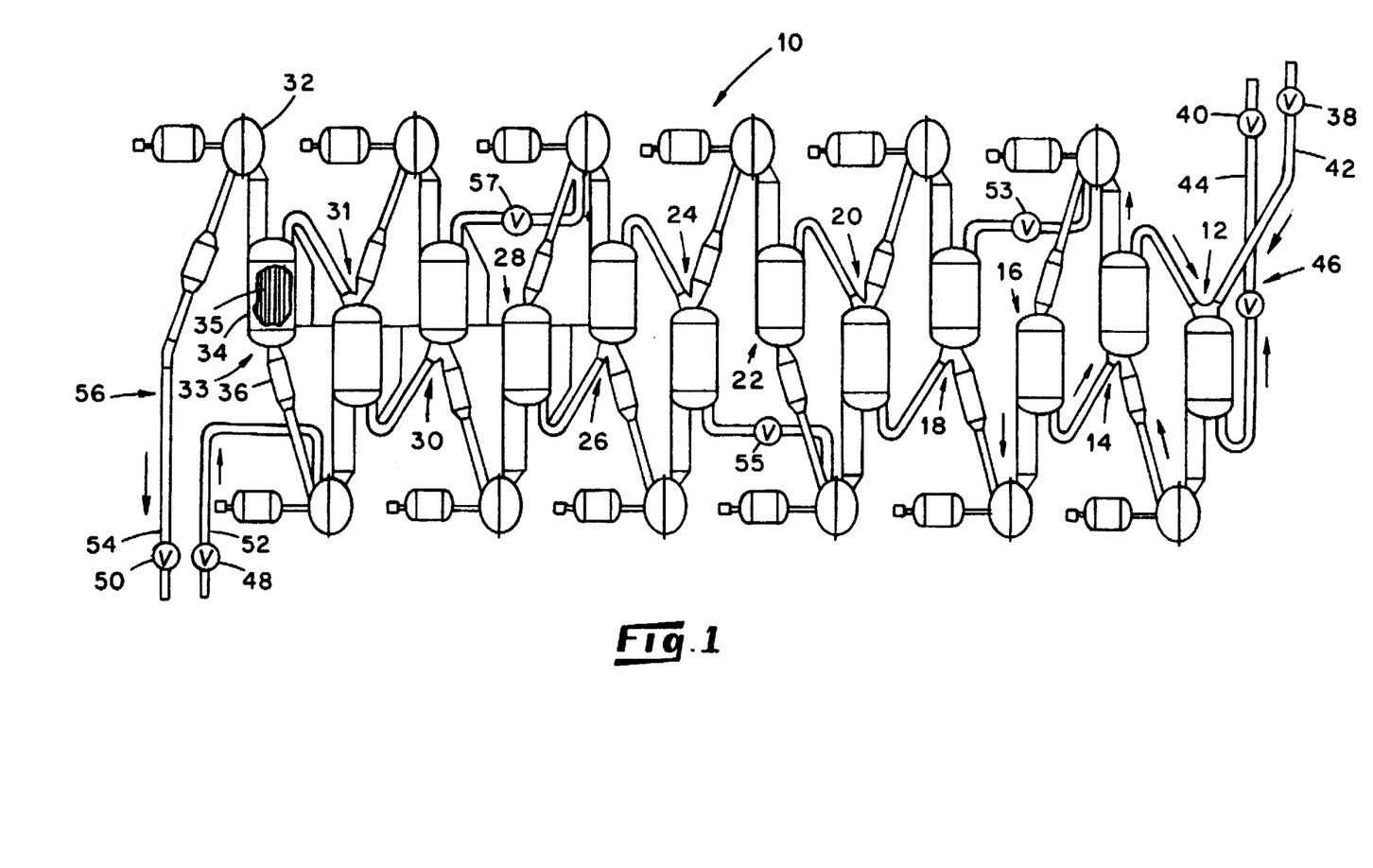
FIG. 1 is generalized representation of one form of a cascade cell of the type commonly employed in a uranium hexafluoride isotope enrichment gaseous diffusion plant and depicting various items of process equipment associated with the cell.

A cell is the smallest portion of a diffusion cascade that can readily be separated from the remainder of the cascade using existing isolation valving and piping. In the present discussion, reference is most often made to a single cell for purposes of simplification of understanding. It is to be recognized that the present process may be employed with a single component of a cell, a single cell, a plurality of cells, or an entire gaseous diffusion cascade. A typical cell 10 of a gaseous diffusion cascade, such as the cell depicted in FIG. 1, may have an internal gas volume that ranges widely, e.g. an internal gas volume ranging up to about 50,000 $ft^3$, and contains a plurality, e.g., six to twelve, diffusion stages 12–33, each stage comprising a compressor 32, a converter 34 which contains the isotope separation barrier 35, and a heat exchanger 36. Isolation valves 38 and 40 are interposed along the length of each of an inlet conduit 42 and outlet conduit 44, respectively, at one end 46 of the cell. Further isolation valves 48 and 50 are interposed along the length of a further inlet conduit 52 and a further outlet conduit 54, respectively, at the opposite end 56 of the cell. These valves are employed to control the flow of gas between adjacent cells of a cascade. As desired, through the use of the isolation valves, a given cell may be isolated from the cascade for purposes of the present invention. Other isolation and/or flow control values, such as valves 53, 55 and 57 are normally provided for control of the flow of gas within a cell.

Figure 2:
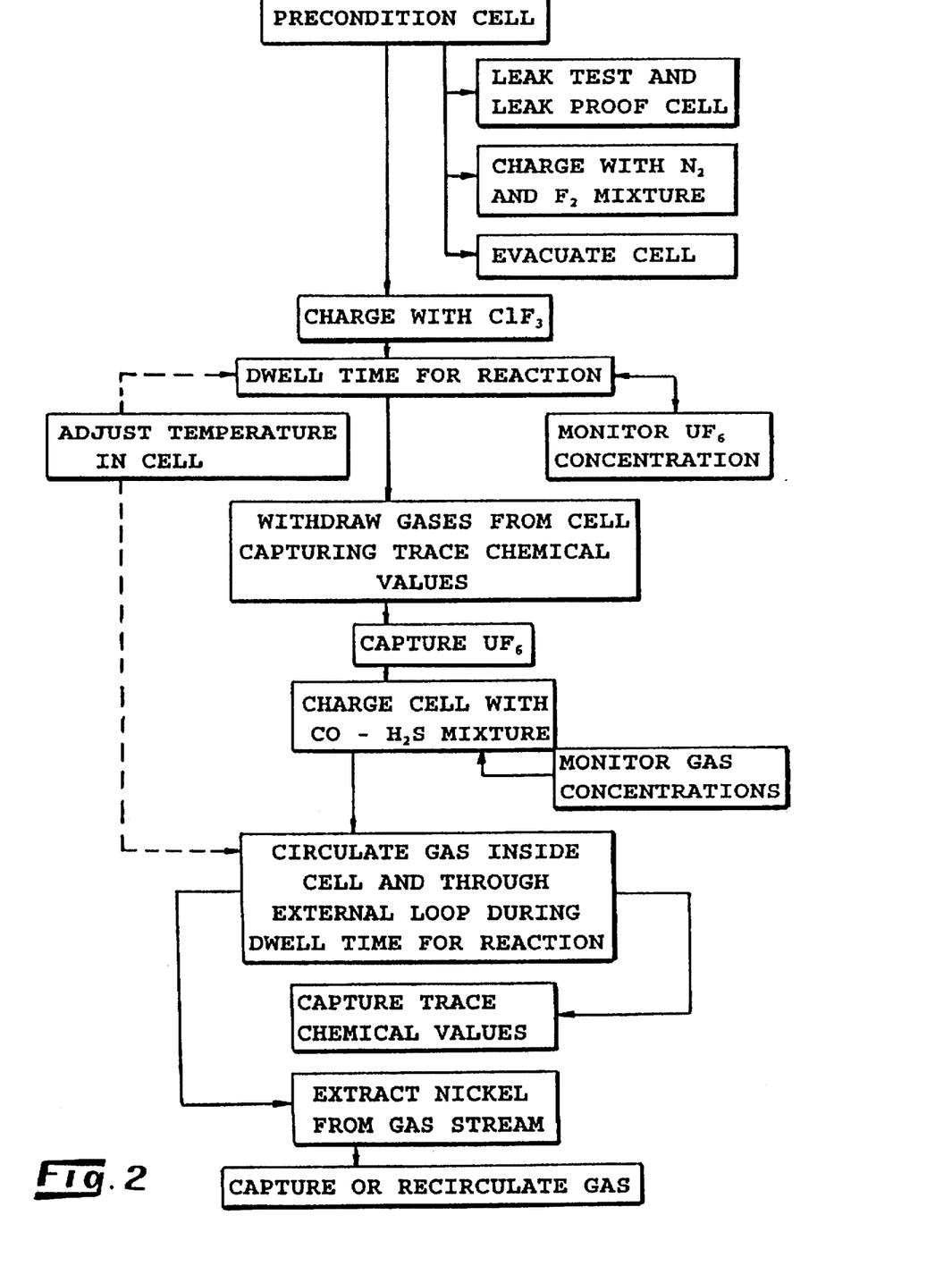
FIG. 2 is a generalized flow diagram of one embodiment of the process of the present invention.

Many of the cells of those gaseous diffusion cascades which have been "moth-balled", i.e. taken out of operation, were backfilled with a dry inert gas and sealed. Over time, these seals, on occasion, have failed. In these instances, the cell may contain no or little inert gas, or even may contain ambient air. Accordingly, as depicted in FIG. 2, the first step in one embodiment of the present process is to condition the cell for further operations. This conditioning may include an initial evacuation, capture, recycle and/or proper disposal of any gas held within the cell. If the cell is "dry", that is, it contains no water vapor, only dry inert gas, is held under a vacuum, or after the cell has been initially evacuated, the cell is leak tested and leak proofed to assure that it can be operated over an extended period of time under subatmospheric conditions. Thereafter, the cell is dried, as necessary, by the passage of a small subatmospheric charge, e.g. in the range of 1000 ppm, of a fluorine-nitrogen mixture, for example, through the cell. This charge is intended to effect a carefully controlled reaction between the fluorine-nitrogen mixture and any residual water vapor or hydrocarbons that might be present in the cell. This mixture is thereafter evacuated from the cell. As required or desired, small amounts of other aggressive chemical moieties such as chlorine trifluoride, bromine trifluoride, iodine heptafluoride, dioxygen difluoride, etc. may be employed for effecting the drying function. This preliminary cell conditioning step serves as a precaution against inadvertent worker exposure to gas(es) escaping from the cell, as assurance that those chemical reactions which are to be carried out within the cell are not disturbed or influenced by inleakage of moist ambient air, and as assurance that subatmospheric pressure will be maintained within the cell during the extended time period over which the process equipment is being subjected to halo-fluoride gas and to the gaseous mixture of carbon monoxide and promoter. Following these principal preparatory procedures, gaseous halofluoride reactant, preferably chlorine triflouride, is slowly introduced to the cell.

The presently existing "moth-balled" uranium hexafluoride isotope enrichment cascades have been analyzed under the auspices of the U.S. Department of Energy, using externally disposed analytical instruments so that it is currently known approximately how much uranium-containing materials are located within each cell of each cascade. With this information in hand, the quantity of chlorine trifluoride charged to each cell is function of the quantity of uranium-containing compounds located with the cell, and is chosen to be sufficient to assure that there is adequate chlorine trifluoride in the cell to drive to completion the conversion of the uranium-containing compounds in the cell to gaseous uranium hexafluoride. A molar ratio of chlorine trifluoride to uranium hexafluoride within the cell of at least 2:1 preferably is maintained to assure an appropriate excess of chlorine trifluoride. Any excess chlorine trifluoride is readily recoverable for reuse within the same or another cell. An excess of chlorine trifluoride may be desirable in certain circumstances as an aid to keeping the partial pressure of the $UF_6$ below that value at which the $UF_6$ is subject to desublimination. The environment within the cell is monitored during the progress of the conversion of the uranium-containing compounds to uranium hexafluoride to assure maintenance of at least the desired 2:1 ratio and to determine when the uranium hexafluoride concentration within the cell has stabilized. This stabilization of the concentration of the uranium hexafluoride gas within the cell, when chlorine trifluoride is present in excess within the cell, indicates the completion of the conversion reaction within the cell and is used as a signal to commence withdrawal of the uranium hexafluoride from the cell. Under certain circumstances, such as when the quantity of uranium-containing compounds located within the cell is sufficiently large, the partial pressure of the uranium hexafluoride within the cell may rise to the point where it becomes prudent to circulate the gas stream from the cell through a recovery loop disposed externally of the cell. In this loop, the gas stream is passed through a uranium hexafluoride trap to capture at least a substantial portion of the uranium hexafluoride. The gas stream, now comprising primarily chlorine trifluoride, is then returned to the cell. This action ensures optimization of the rate of conversion of uranium-containing compounds located within the cell to uranium hexafluoride, along with reduction of any tendency of the $UF_6$ to desubliminate within the cell.

In any event, the $ClF_3$ is allowed to remain in the cell for a time which is sufficient to permit conversion of the uranium-containing compounds within the cell to gaseous uranium hexafluoride according to the approximate following reaction:

$$ClF_3 + UO_2F_2 \cdot H_2O \rightarrow 1.5ClO_2F + 1.5\ ClF + UF_6 + 2HF \quad \text{(Eq. 1)}$$

Circulation of the gaseous $ClF_3$ within the cell, is employed as desired, to sweep the gas past reaction sites, e.g. past uranium-containing deposits, to sweep away the newly-formed gaseous $UF_6$ and expose fresh surfaces on the deposits to further $ClF_3$, thereby enhancing the desired reaction. This circulation of the gas within the cell also serves to move the chlorine trifluoride into and/or through the pores of the barrier. Also, circulation of the gases within the cell is amenable to continuous withdrawal of these gases from the cell and the passing of the gases through one or more $UF_6$ collectors disposed externally of the cell as noted hereinabove. Within these collectors, the $UF_6$ in the gas stream is extracted, with the $ClF_3$ being passed through the collector and returned to the cell. Conventional sodium fluoride traps may be used as $UF_6$ collectors. The withdrawal of at least a major portion of the $UF_6$ from the gas stream further serves to reduce the partial pressure of the $UF_6$ within the gas stream as noted herein, and further reduces the likelihood of its desublimination on the interior surfaces of the process equipment. To avoid criticality potential, small multiple $UF_6$ collectors are preferred. Recovery of the $UF_6$ and other chemical values from the collectors may be effected by known transfer means such as by introducing heat into the collector to selectively volatilize and collect these chemical values.

With reference to FIG. 2, in situ removal of nickel from the interior of the gaseous diffusion process equipment is effected by introducing into the process equipment of the cell, after the uranium values have been removed from the interior of the equipment, and the cell has been evacuated, a mixture of gaseous carbon monoxide and a promoter gas, preferably hydrogen sulfide gas. This mixture of gases is circulated through the process equipment of the cell, with a residence time within the cell which is sufficient for the carbonylation of the metallic nickel disposed within the interior of the process equipment. In addition to being dependent upon the operational parameters taught herein, the time for the carbonylation reaction to go to completion is dependent upon the type and quantity, if any, of sediment remaining on the interior surface of the process equipment which was not removed by the prior treatment with chlorine trifluoride. The concentration of nickel carbonyl within the cell is monitored and when this concentration asymptotically approaches zero, it is taken as an indication that all the available nickel in the process equipment has been carbonylated. Circulation of the gas stream within the cell includes passing the gas stream through a treatment loop externally of the cell. In this loop, the nickel is extracted as by chemical vapor deposition. Upon completion of the nickel extraction, the gases from the nickel extraction step are either captured for disposal off site or are conditioned and recycled to the same or another cell. Inasmuch as the nickel carbonyl to nickel conversion takes place at an elevated temperature, the heated gases from the nickel extraction step preferably are cooled to a temperature of less than 40° C. before being returned to the cell.

Figure 3:
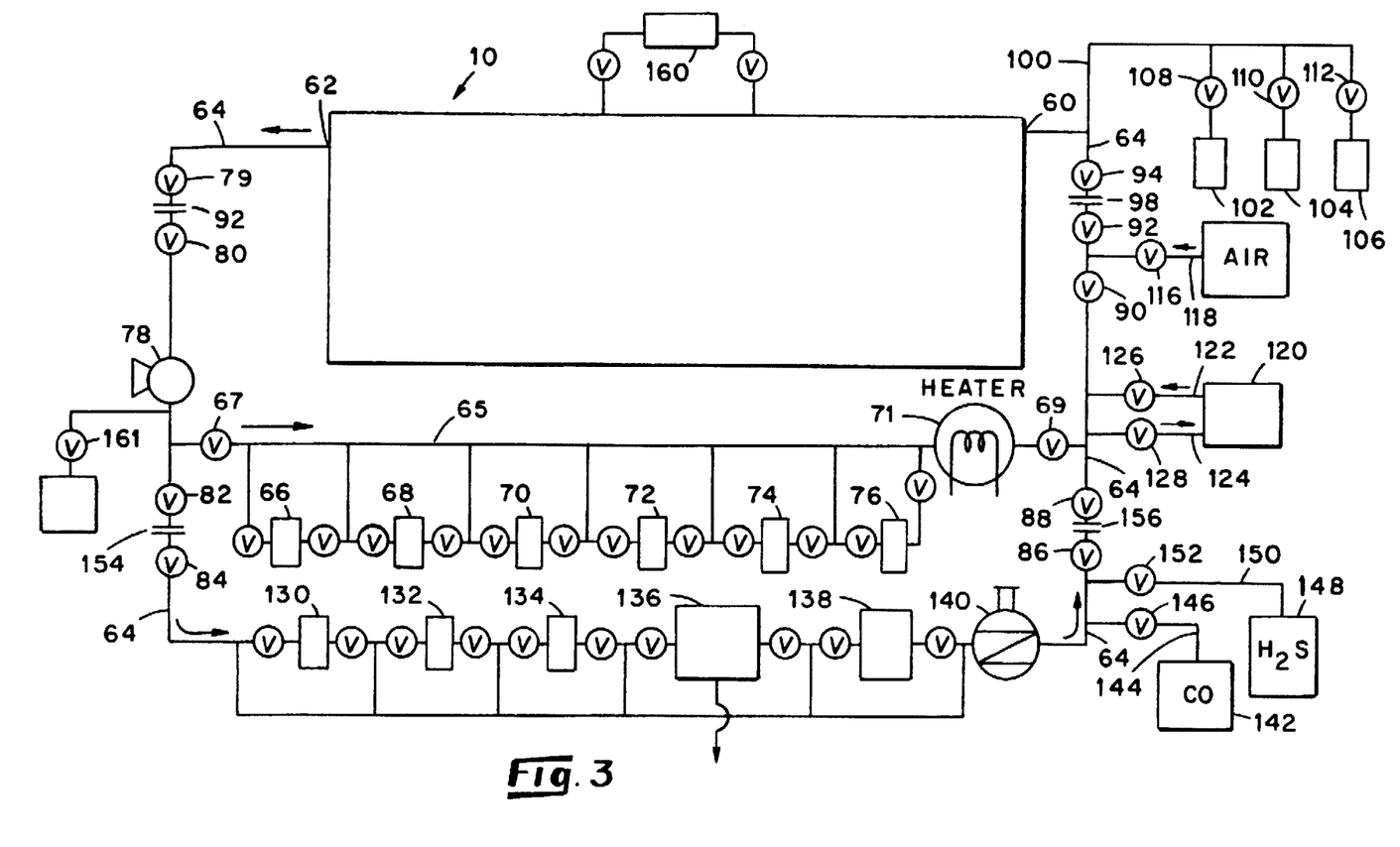
FIG. 3 is a schematic representation of one embodiment of apparatus useful in carrying out the in situ recovery of chemical values from the interior of process equipment theretofore employed in a uranium hexafluoride isotope enrichment gaseous diffusion plant.

Referring specifically to FIG. 3, in one embodiment of apparatus useful in carrying out the process of the present invention relative to a cell 10 of a uranium hexafluoride isotope enrichment gaseous diffusion cascade, the cell 10 is connected at its inlet 60 and outlet 62 in a processing loop in fluid flow communication with ancillary processing equipment. In this depicted embodiment, the outlet 62 from the cell 10 is connected via a conduit 64 and a by-pass conduit 65 to one or more of a series of desublimination, adsorption or absorption type collection devices 66, 68 and 70, each of which is designed to extract trace radionuclide gases, a sodium fluoride trap 72 which is maintained at a temperature of about 200° F. to extract initial quantities of $UF_6$, a second sodium fluoride trap 74 which is maintained at ambient temperature (about 70° F.) to extract hydrogen fluoride and residual quantities of $UF_6$. Any gaseous ClF and/or HF formed as "by-products" from the reaction of chlorine triflouride and uranyl fluoride, for example, (see Eq. 1) is collected in the second sodium flouride trap 74. Downstream of the sodium fluoride nitrogen traps, there is provided a cold trap 76 (operated at liquid nitrogen temperatures) and which is designed for transfer of $UF_6$ from the sodium fluoride traps to storage containers. Appropriate conduits and valves are provided for selectively directing gas flow from conduit 65 to and from the several collection devices. In particular valves 67 and 69, which are interposed along the length of the by-pass conduit 65, provide for closing off this conduit 65 from all gas flow therethrough. Also interposed along the length of the conduit 65, there is provided a heater 71 for use in adjusting the temperature of the gas stream leaving the conduit 65 for return to the cell 10. As depicted in FIG. 3, the conduit 64 serves to convey the gas stream from the cell through the ancillary equipment, and return of a portion of the gas stream to the cell at inlet 60. A pump 78 is interposed along the length of the conduit 64 to promote flow of the gas stream from the cell and through the ancillary processing equipment. Interposed along the length of the conduit 64 are a plurality of valves 79, 80, 82, 84, 86, 88, 90, 92 and 94 for controlling the flow of gas through the conduit 64. More specifically, the valves 79 and 80 and the valves 92 and 94, respectively, are disposed on opposite sides of a flanged connections 96 and 98 to provide for removable connection of the ancillary apparatus to the inlet and outlet of the cell.

By means of a conduit 100, sources of nitrogen 102, fluorine 104 and chlorine trifluoride 106 are connected to conduit 64 to provide for the selective introduction of these gases into the cell. Valves 108, 110 and 112 provide for control over the flow of nitrogen, fluorine or chlorine trifluoride gas from their respective sources into the cell. Dry air or another inert gas from a pressurized source 114 thereof is connected via a valved 116 conduit 118 to the conduit 64 for the selective introduction of dry air or another inert gas for purging purposes and the like, as needed.

A gas analyzer 120 such as a Fourier Transform Infrared Spectrometer (FTIR) and a gas chromograph are connected via conduits 122 and 124 and valves 126 and 128 in a closed fluid flow loop off the conduit 64 to provide for monitoring of the concentration of $UF_6$, CO and/or other gases in the gas stream from the cell. In the depicted embodiment, when the gas analyzer indicates a stabilized value for the concentration of uranium hexafluoride within the cell, this situation is taken as indicative of the completion of the reaction of chlorine trifluoride with all available uranium compounds within the interior of the process equipment making up the cell. As desired, the output from the gas analyzer may be employed to control the several flow control valves of the system and thereby automate certain of the operations of the present process. Several and/or different sampling points along the length of the conduit 64 may be employed as deemed necessary for obtaining gas concentrations along the length of the conduit 64 or at one or more selected points along the conduit 64.

Still referring to FIG. 3, upon closing of valves 67 and 69, and opening of valves 82, 84, 86 and 88, there is opened a fluid flow path, via conduit 64, for a carbon monoxide/nickel carbonyl gas stream from the cell through further collection devices 130, 132, and 134 for trace contaminates which may be present in the carbon monoxide/nickel carbonyl gas stream from the cell. Downstream of these collection devices there is provided a nickel extraction device 136, a gas conditioner 138, and a gas cooler 140. The gas stream exiting the cooler 140, which now comprises a mixture of carbon monoxide and hydrogen sulfide, is redirected, via conduit 64, to the inlet 60 to the cell. As noted above, the pump 78 serves to move the gas stream through the cell, along the conduit 64 and through the various components of the apparatus. A source of carbon monoxide gas 142 is connected via a conduit 144 and a valve 146 in fluid flow communication with the conduit 64. In like manner, a source of hydrogen sulfide gas 148 is connected via a conduit 150 and a valve 152 in fluid flow communication with the conduit 64. By means of valves 82 and 84 and a flanged connection 154, and valves 86 and 88 and a further flanged connection 156, interposed along the length of conduit 64, that portion of the ancillary apparatus which is dedicated to the functions of recovering of nickel values from the cell may be isolated for inclusion in a mobile cart or the like if desired.

As needed, an air heater 160, may be provided for supplying heated air to the exterior of process equipment of the cell 10 for maintaining the desired temperature within the cell. Alternatively, partial or all the heat required may be supplied by heating the recirculated gas stream.

In a typical operation of the apparatus depicted in FIG. 3, by means of the flanged connections 92 and 98, the ancillary apparatus is connected in fluid flow communication with the process equipment associated with the cell 10. With valves 79, 80, 67, 69, 90, 92 and 94 open, and with all other valves closed, the cell is conditioned by opening selected ones of the valves 116 to admit dry air to the conduit 64, valves 108, and/or 110 to admit nitrogen and/or fluorine, respectively, to conduit 64. The pump 78 is activated and the interior of the process equipment associated with the cell 10 subjected to the nitrogen/fluoride gases which react with moisture and/or organics within the cell. Thereafter, the valves 116, 108 and/or 110 are closed, the gases and/or their reaction byproducts are evacuated from the cell and captured for proper disposal, as by means of a collection tank 161. Prior to charging the cell with chlorine trifluoride, valves 79,80,67, 69,90,92 and 94 are opened, all other valves being closed. With the pump 78 activated, valve 112 which controls the flow of chlorine trifluoride from the source 106 thereof is opened to slowly admit chlorine trifluoride gas into the conduit 64 whereupon this gas is caused to flow into and fill the interior of all the process equipment associated with the cell 10. Alternatively, after the cell has been charged with chlorine trifluoride gas, the pump 78 may be deactivated or it may continue in operation to circulate a gas stream from the cell through the by-pass conduit 65. As needed, the gas stream may be circulated also through one or more of the gas collection devices 66,68,70,72 or 74. The chlorine trifluoride within the process equipment of the cell is retained in the process equipment while the concentration of the $UF_6$ within the process equipment is monitored by the gas analyzer 120. This dwell time may range from a few days to several months, depending upon the condition of the cell, such as the overall quantity and the size of individual deposits of uranium-containing compound(s) within the process equipment, the form and age of the uranium compound, the location of the deposit within the process equipment, and like factors. During this dwell time, if no circulation of the chlorine fluoride is desired, the valves 79 and 94 may be closed and the pump 78 deactivated.

Following completion of the dwell time of the chlorine fluoride within the process equipment, the pump 74 is activated to circulate the gas stream from the cell through the gas collection devices 66–70 to remove trace chemical values, such as technetium. Each of the collection devices in maintained under conditions that are specifically for a particular trace chemical value, e.g. desublimination, absorption or adsorption. Further, the gas stream from the cell is passed through the sodium fluoride traps 72 and 74 to extract uranium hexaflouride from the gas stream. The gas stream, now containing primarily chlorine triflouride is recirculated to the cell, or is captured employing conventional techniques and apparatus for reuse in a further cell. Upon completion of the steps relating to recovery of the uranium values from the cell, the cell is evacuated preparatory to commencement of the nickel recovery steps.

In carrying out the nickel recovery steps, the valves 67 and 69 are closed and the valves 79, 80, 82, 84, 86, 88, 90, 92, and 94 are opened and the pump 78 is activated. Thereupon, valve 146 is opened to admit a selected volume of carbon monoxide gas to conduit 64. Further, valve 152 is opened to admit a selected volume of hydrogen sulfide gas to the conduit 64, these gases becoming thoroughly mixed within the conduit 64 and being charged into the interior of the process equipment associated with the cell 10. The mixture of carbon monoxide and hydrogen sulfide gases within the process equipment carbonylates the nickel metal disposed within the interior of the process equipment, to form nickel carbonyl. In view of the vast amount of nickel found in a cell, it is imperative that the gas stream be circulated externally of the cell so that at least a portion of the nickel carbonyl can be extracted from the gas stream on a continuous basis. For this purpose, gas(es) within the cell are withdrawn and circulated along the conduit 64 by the pump 78. This activity moves the gas stream from the cell, through one or more collection devices 130, 132 and/or 134, the nickel extraction device 136, the gas conditioner 138, and the gas cooler 140 and returns the gas stream, free of nickel carbonyl and trace chemical values such as technetium, to the cell. Upon completion of the steps relating to recovery of the nickel, and evacuation of the apparatus, including the cell, the entire apparatus may be disconnected from the cell 10 at the flanged connections 96 and 98. Alternatively, only that portion of the apparatus associated with the recovery of nickel only may be disconnected from the remainder of the apparatus via the flanged connections 154 and 156. Alternatively, either or both of these series of process steps can be repeated, at the same or higher temperatures, with other promoters, etc. to extract newly exposed chemical values.

In accordance with the present process, the pressure of the gas stream within the process equipment, during the steps of recovering the uranium and/or the nickel values, is maintained subatmospheric, i.e. at a pressure less than the ambient atmospheric pressure, and the temperature of the gas stream within the interior of the process equipment of the cell is established and maintained at not greater than about 65° C. during the dwell time for the chlorine trifluoride within the cell, and preferably at less than 40° C., and most preferably at less than about 30° C. Temperatures within the cell of less than about 65° C. reduce the rate of reaction of the chlorine triflouride with the deposits within the cell, hence increase the time required to complete the desired recovery of the uranium values from the cell. On the other hand, temperatures within the cell of at least ambient temperature (about 15° C.), and under subatmospheric pressure within the cell, have been found to assure against desublimination of $UF_6$. Desublimination, a function of temperature and pressure, can occur whenever the partial pressure of the $UF_6$ is permitted to rise above the pressure on the $UF_6$ pressure curve corresponding to the cell temperatures. For example, this can occur at about 15° C. and a partial pressure of about 1.1 psia of uranium hexaflouride, or at about 26° C. and a partial pressure of about 2.4 psia of uranium hexaflouride. As depicted in FIG. 3, as needed for temperature control within the cell, heat may be supplied to, or removed from the cell. This may be accomplished by any of several means. One suitable means is to employ an inline gas heater 71 or gas cooler 140. Another suitable means is to introduce heat to the exterior of the process equipment as by means of an air heater 160.

As noted, the nickel carbonyl, carbon monoxide/hydrogen sulfide, and/or radionuclide nuclide carbonyl, e.g. technetium carbonyl, gases are withdrawn from the cell and directed, via the conduit 64, through one or more desublimination, absorption or adsorption collection devices which are designed to selectively extract rogue trace chemical values from the gas stream. Specifically, technetium-99 is known to exist in certain existing cells so that provision is made to extract any technetium carbonyl which may be generated in the course of carbonylation of the metallic nickel within the process equipment of the cell. A preferred technetium trap 130 is operated at a temperature of between about 0° C. and about 40° C., preferably between about 20° C. and about 30° C., where any $Tc_2(CO)_{10}$ present in the gas stream is collected by desublimination. Other trace, i.e. rogue, chemical values are extracted by passing the gas stream through one or more further desublimination, absorption or adsorption collection devices 132 and 134. As needed still further collection devices may be added. The gas stream, less the technetium and/or other trace chemical values, is thereupon fed into the nickel extraction device 136 in which the gaseous nickel carbonyl is decomposed into CO and metallic nickel by nickel vapor deposition. The heat transfer mechanism can be seed nickel plates, tubes, pellets, or the like. The nickel extraction device is operated at a temperature of between about 150° C. and about 200° C. and is of a size sufficient to provide a residence time of the gases within the nickel extraction component sufficient to effectively remove nickel values from the gas stream, depending upon the flow rate of the gas stream, the rate of deposition of the nickel, and the concentration of nickel carbonyl in the gas stream. The carbon monoxide/hydrogen sulfide gas mixture passes through the nickel extraction component without change (except becoming heated and freed of nickel carbonyl). The hot carbon monoxide/hydrogen sulfide gas mixture is thereupon directed through the gas cooler 140 where the temperature of the gas stream is reduced to ambient temperature (i.e. preferably less than 40° C. and most preferably less than about 30° C.). This cooled gas stream is thereupon redirected into the cell, or if the removal of nickel from the cell is complete, then the carbon monoxide/hydrogen sulfide gas mixture is collected and stored for use in a further cell. Makeup carbon monoxide gas from the source 142 and/or hydrogen sulfide gas from its source 148, are added to the gas stream as required.

In the embodiment depicted in FIG. 3, the infeed stream of gaseous carbon monoxide from the source 142 is fed via the conduit 144 into the conduit 64, initially to charge the cell and subsequently as makeup as required. To the carbon monoxide gas stream flowing through the conduit 64 there is introduced gaseous hydrogen sulfide from the source 148 via conduit 150, which mixes with the flowing stream of carbon monoxide and is fed, along with the carbon monoxide, into the input gas stream to the cell. As has been discovered by the present inventors, the hydrogen sulfide, in an amount selected from a relatively narrow range of ratios of hydrogen sulfide to nickel, enhances the rate of carbonylization of the nickel by as much as 500 fold, as compared to the carbonylization rate of the nickel in the presence of carbon monoxide alone. Specifically, in the present process, a molar ratio of hydrogen sulfide to carbon monoxide gas of between about 1:25 and about 1:1000, and preferably about 1:100, has been discovered to provide the unexpectedly fast rate of carbonylation of the nickel within the cell under the operating conditions within the cell. Further, these ratios of hydrogen sulfide to carbon monoxide simultaneously provide for carbonylation of technetium found in a cell. Notably, these high rates of carbonylation are obtained without material attack upon the steel of the process equipment.

As needed, prior to the charging of the cell with the mixture of carbon monoxide and hydrogen sulfide gases, the process equipment of the cell may be treated with a stream of moist air to break down any nickel fluoride coating on the interior surfaces of the process equipment to more fully expose the nickel to subsequent treatment with the carbonylation gas mixture.

In one test of the carbonylization of nickel with carbon monoxide, nickel powder, as the surrogate for the worst-case situation of nickel barriers that have disintegrated into powder in gaseous diffusion cells after treatment with carbon monoxide, was carbonylated at nominal room temperature and subatmospheric pressure to essentially duplicate the process operating conditions disclosed by the present inventors for nickel recovery from a cell by reaction with carbon monoxide to form nickel carbonyl. The test was designed to simulate static (i.e. noncirculation of the reactant gas) and dynamic (i.e. the sweeping of the cells interiorly of the process equipment thereof with the carbon monoxide gas mixture) conditions to convert the nickel to gaseous nickel carbonyl $Ni(CO)_4$ and recover the carbonyl as plated metal on a heated surface.

Static and dynamic carbonylation was performed in a 4.5 liter stainless steel high-pressure reaction vessel. The large, air-tight volume allowed carbon monoxide and nickel carbonyl to equilibrate in static tests and thus permit nickel to nickel carbonyl conversion rates to be determined by monitoring the pressure/temperature ratio as a function of time. Subatmospheric pressure dynamic tests, where a flow of carbon monoxide was maintained through the vessel, were performed by controlling the gas flow at the vessel inlet and the spent gas was extracted from the experimental equipment. Due the elevation above sea level of the test site, the on-site nominal ambient pressure was approximately 0.85 of standard sea level, and is considered as subatmospheric. The post static test reactor bleed-down and purge gases, as well as the dynamic test carbon monoxide were passed through a glass-tube thermal decomposer maintained between about 195° C. to 230° C. to recover the nickel by thermal decomposition and chemical vapor deposition.

Whereas it has been found possible to convert nickel metal to nickel carbonyl by reacting the nickel with only carbon monoxide, conversion rates are economically prohibitively slow. Tests performed using only carbon monoxide were performed on nominal 50 g and 3.5 g nickel powder charges under 1.5 and 0.85 atm carbon monoxide, respectively. Results of these tests are summarized in Table I.

Addition of the hydrogen sulfide gas increased the conversion rate of nickel to nickel carbonyl more than several hundred fold over conversion rates without using hydrogen sulfide gas. The maximum conversion rates presented in Table II were derived from the slope of pressure/temperature ratio versus time curves. Nickel conversion to nickel carbonyl calculated from starting and ending carbon monoxide pressures agreed well with nickel conversion values obtained from sample weight loss, metal recovered and their chemical analysis. The test average conversion rates in Table II were calculated from the total nickel extracted from the sample. The pressure/temperature ratio versus time curves for the hydrogen sulfide-accelerated carbonylations went through a maximum conversion rate after activation and then slowed down as the carbon monoxide pressure decreased toward equilibrium. Adding carbon monoxide without any hydrogen sulfide increased the conversion rate to the maximum and the cycle was repeated. This was done once in all tests. In static carbonylation tests without hydrogen sulfide, the pressure/temperature ratio versus time curve slope was essentially constant and the maximum pressure drop in the longest (250 h) test was only 0.05 atm. For these tests also, nickel conversion quantity calculated from the slope, starting and ending carbon monoxide pressures and sample weight loss, metal recovered and chemical analysis all agree well.

These test results demonstrate the hydrogen sulfide-accelerated carbonylation process for in situ recovery of

TABLE I

| Test Type | Dynamic | Dynamic | Static | Static | Static |
|---|---|---|---|---|---|
| Weight, g | 51.67 | 51.34 | 51.66 | 51.55 | 3.26 |
| Duration, h | 48 | 65 | 137 | 259 | 139 |
| CO pressure, atm | 1.5 | 0.85 | 1.5 | 1.5 | 1.5 |
| Temperature, °C. | 26–28 | 21–25 | 20–29 | 23–43 | 24–26 |
| Ni converted, g | 0.01 | 0.01 | 0.11 | 0.22 | 0.14 |
| Conversion rate, pct/day | $9.7 \times 10^{-3}$ | $7.2 \times 10^{-3}$ | $37 \times 10^{-3}$ | $39 \times 10^{-4}$ | $744 \times 10^{-3}$ |

Nickel to nickel carbonyl conversion was realized in all cases and nickel vapor was deposited in the thermal decomposer. However, as seen from Table I, in all cases the conversion rates were very slow, so slow that nickel reaction with carbon monoxide at the highest conversion rate in Table I would take as much as four and one-half months for complete conversion of the nickel sample.

Table II summarizes the result of further carbonylation tests using the same basic test procedures as above, except that hydrogen sulfide gas was added to the carbon monoxide before the carbon monoxide gas was introduced to the nickel in the reaction vessel.

nickel from the interior of gaseous diffusion process equipment. The rates leading to complete metal recovery are on the order of days at ambient temperatures and subatmospheric pressure and are fully compatible with the parameters associated with the uranium recovery steps employing gaseous chlorine trifluoride as claimed herein.

It is noted that the steps of the present process admit to division into three operations, namely, initial conditioning of a cell, treatment to recover the uranium values therefrom, followed by treatment of the cell to recover nickel values from the cell. This division of the steps of the present process permits the realization of certain advantages includ-

TABLE II

| Test Type | Static | Static | Static | Static | Dynamic | Static |
|---|---|---|---|---|---|---|
| Weight, g | 51.65 | 51.51 | 51.78 | 3.26 | 3.26 | 12.16 |
| $H_2S:CO$ mole ratio | 1:5.5 | 1:24.5 | 1:100 | 1:100 | 1:100 | 1:100 |
| Test Duration, h | 22 | 24 | 26 | 162 | 112.5 | 138 |
| CO pressure, atm | 0.85–1.5 | 0.85–1.5 | 0.89–1.5 | 0.87–1.5 | 0.85 | 0.82–1.53 |
| Temperature, °C. | 23–24 | 24–25 | 24–25 | 25–27 | 25–29 | 23–27 |
| Ni converted, g | 3.67 | 4.40 | 3.05 | 2.87 | 1.36 | 5.79 |
| Conversion rate, pct/day | | | | | | |
| Maximum | 12.8 | 21.5 | 12.4 | 64.1 | 38.5 | 33.3 |
| Test average | 7.75 | 8.54 | 5.44 | 13.0 | 8.9 | 8.3 |
| Nickel Form | Powder | Powder | Powder | Powder | Powder | Foam metal | ing operator efficiency, and other efficiencies, in that new cells may be undergoing initial conditioning, while awaiting completion of the chemical reactions in previously prepared and charged cells. For these reasons, it is desirable that certain components of the ancillary apparatus required to carry out the method of the present invention be made mobile so that it can be moved from cell to cell. For example, in one embodiment, the apparatus for carrying out the initial preparation of the cell and for the initial introduction of the chlorine trifluoride into the cell may be physically separate from the apparatus required for maintaining the operation of the cell during the dwell time for completion of the chemical reactions within the cell that relate to recovery of uranium values. Still further, the apparatus required to pass mixture of carbon monoxide and hydrogen sulfide gases through a cell, withdrawal of the nickel carbonyl gas, and recovery of the nickel as a metal, may be a physically separate entity. Specifically, this ancillary equipment may take the form of one or more mobile cart assemblies, each of which carries thereon those components of the apparatus which are required for performing each of one or more of the divisions referred to above and/or other ancillary functions associated with the present process as will be recognized by a person skilled in the art.

Based upon the inventors' present knowledge, the cost per pound of recovered nickel from the process equipment of a uranium hexafluoride isotope enrichment gaseous diffusion plant ranges between about $1.00 and about $2.00 per lb of nickel recovered. The current price of nickel metal on the open market is about $3.75 per lb, thereby indicating the cost effectiveness of the present process relative to the nickel recovery aspects thereof. In the present process, the uranium values are recovered as uranium hexafluoride which is readily reintroduced, without further treatment, into currently operating gaseous diffusion plants as a "feed" material. Notably, this recovered uranium hexafluoride is free of technetium and/or other trace radionuclides.

Importantly, in accord with one aspect of the invention, the present process is carried out in situ. By this it is meant that the present process recovers the chemical values from the process equipment which is the source of the chemical values and the recovery process employs the process equipment itself as a part of the apparatus employed in the carrying out of the recovery process. This factor is critical to the economic effectiveness of the present process in that the present process solves the recovery problem at the situs of the problem—in the process equipment itself. By this means, the process equipment need not be disassembled, modified or moved. The present process utilizes the existing process equipment "as is, where is", subject to preconditioning as described hereinabove. This factor provides a major cost advantage in the present process. Further, effecting the recovery operation in situ requires the provision of only limited ancillary apparatus, principally recovery apparatus for capture of the chemical values which are removed from the process equipment. Uniquely the present process provides the means whereby chemical values to be recovered are not removed from the process equipment in the same, or even a like form, as they currently exist in the process equipment. But rather, the present process converts the chemical values from their existing state, i.e., a solid state, to a gaseous state, this conversion taking place at the sites of the originally existing chemical values, and thereafter transfers the converted chemical value, in its new state, (i.e. gaseous state) to a remote location for capture of the value in a useful and desirable form, e.g., a different state and/or a different chemical moiety. Still further, the present process takes full advantage of the existing process equipment which has had incorporated therein gas-tight engineering design for the containment of, and flow of, gas(es) therethrough under controlled conditions of temperature and subatmospheric pressure. For these and other reasons, the present in situ process enjoys economic advantages associated with initial capital investment and ongoing operating costs.

It is to be recognized the exact chemical form of the uranium-containing compounds, and/or other radioactive compounds, to be found in a given cell is not known with preciseness. Using radioactivity analyses, conducted from a location external to the process equipment, the quantity of uranium-containing compounds within a given cell has been determined generally, as has the general location of the uranium-containing compounds within the process equipment. Further, through chemical analysis of compounds recovered during wet decontamination of selected items of process equipment, it is known that the major uranium-containing compounds to be found is a given cell appears to be a uranium oxide or uranyl fluoride. In similar manner, it is not known with certainty which radionuclides may be present in a given cell, nor precisely how much of a given radionuclide may be present. In the event that a deposit of metal-based materials are found to contain multiple layers of diverse metal-based materials, it is to be recognized that successive applications of the present method may be employed to remove these possible diverse deposits. In any event, the method of the present invention remains the same, that is, the metal-based material disposed within the interior of the process equipment is subjected to a gaseous reactant or a mixture of gaseous reactants to convert the metal-based component of the material to a gaseous form of the metal, withdrawing the gaseous form from the reaction site, and recovering the metal, either as a metal or in its gaseous form. The metal-based materials addressed by the present method are those which will react similarly under temperatures of between about 10° C. and 150° C. at subatmospheric pressure to form a vaporized form of the metal. As noted, the present method can be carried out in situ as in the instance of the recovery of uranium and nickel values from a cascade cell. The method also has been found useful in the recovery of trace quantities of various radionuclides, such as technetium, employing the same general steps of the method, and in fact, in certain instances, as a direct result of the same steps. Most notably, the present method does not generate appreciable secondary waste that requires other and costly treatment, either for safety or environmental reasons.

Whereas the present process is capable of removing essentially all of the uranium-containing compounds found within a cell, it is only necessary to remove sufficient deposits to reduce the radioactivity levels of the process equipment below the free-release limits of Regulatory Guide 1.86. Further, the conversion of nickel metal to nickel carbonyl has been found to be effective under the conditions of the present invention so that 98% or more of the nickel present in the process equipment is recoverable by the present process.

Whereas the present invention has been described herein primarily in connection with the recovery of uranium and nickel values from the process equipment associated with a uranium hexaflouride isotope enrichment cascade, it is to be recognized that certain aspects of the invention are suitable for use in other environments. In particular, the steps associated with the recovery of nickel metal are novel in and of themselves as a method for the recovery of metallic nickel from various sources which have no uranium associated therewith. For example, one can employ the nickel recovery aspect of the present invention in recovering metallic nickel from mixtures of nickel and other metals, oxides and/or other chemical moieties. In this type recovery operation, the source of nickel may be placed in a reaction vessel and subjected to a mixture of carbon monoxide and hydrogen sulfide gases to preferentially carbonylate the nickel at a temperature of less that 40° C. and subatmospheric pressure.

When carried out in situ, the present method offers several significant advantages. First, as noted hereinabove, there is a significant economic advantage. Second, there is a safety advantage in that the highly toxic nickel carbonyl is never outside the apparatus employed in carrying out the invention. In this respect, it is noted that the nickel carbonyl is formed within the interior of the process equipment, withdraw via the treatment loop, and then converted to metallic nickel. In this manner, the nickel carbonyl constitutes a fugitive intermediate that is at all times contained under subatmospheric pressure and thereby contained at all times of its existence within the process apparatus. This advantage permits a less strenuous, and less costly, safety program, but without sacrifice of safety itself. Third, the present process does not generate an appreciable quantity of waste material that requires further offsite processing prior to its disposal. Secondary wastes, such as the liquid wastes generated in the prior art liquid-based processes for recovering metals are costly from several aspects, such as handling, storage, and disposal.

What is claimed:

1. A process for the recovery of uranium and nickel values from one or more items of process equipment theretofore employed in a uranium hexafluoride isotope enrichment gaseous diffusion plant employing the steps of conditioning an item of process equipment to ensure its freedom from undesirable chemical values, subjecting said conditioned item of process equipment to a quantity of a gaseous fluorinating agent that is capable of converting at least uranium oxide and/or uranyl fluoride to gaseous uranium hexafluoride at a temperature not greater than about 65° C., and at subatmospheric pressure, for a time sufficient to convert at least uranium compounds disposed on the surfaces of the item of process equipment to gaseous uranium hexafluoride, withdrawing and capturing said uranium hexafluoride, thereafter, subjecting said item of process equipment to a mixture of gaseous carbon monoxide and a gaseous promoter, at subatmospheric pressure and at a temperature less than the temperature at which nickel carbonyl decomposes when at a subatmospheric pressure, for a time sufficient to convert metallic nickel exposed on the surfaces of the item of process equipment to gaseous nickel carbonyl, withdrawing said gaseous nickel carbonyl, and converting said gaseous nickel carbonyl to metallic nickel.

2. The process of claim 1 wherein the gaseous fluorinating agent comprises gaseous chlorine trifluoride.

3. The process of claim 1 wherein the gaseous promoter comprises gaseous hydrogen sulfide.

4. The process of claim 1 wherein the items of process equipment comprise the process equipment included in a preexisting cell of a cascade for the isotope enrichment of uranium hexafluoride.

5. The process of claim 1 and including the step of maintaining the temperature of the gaseous fluorinating agent at a temperature not greater than about 65° C.

6. The process of claim 1 and including the step of maintaining the temperature of the mixture of carbon monoxide and gaseous promoter, during the time in which the mixture of gas is in position to convert metallic nickel exposed on the surfaces of the item of process equipment to gaseous nickel carbonyl, at a temperature less than the temperature at which the pressure developed by the gaseous mixture of carbon monoxide, gaseous promoter and nickel carbonyl is no longer subatmospheric.

7. The process of claim 1 and including the step of circulating the mixture of carbon monoxide and gaseous promoter past metallic nickel exposed on the surfaces of the item of process equipment to develop a flowing gas stream containing a mixture of gaseous carbon monoxide, gaseous promoter and gaseous nickel carbonyl.

8. The process of claim 7 and including the steps of circulating the flowing gas stream through a treatment loop disposed remote from the item of process equipment, and within the treatment loop, converting nickel carbonyl in the flowing gas stream to metallic nickel.

9. The process of claim 1 and including the step of selecting the gaseous fluorinating agent from the group of gases comprising chlorine trifluoride, bromine trifluoride, iodine heptafluoride, and dioxygen difluoride.

10. The process of claim 1 and including the step of selecting the gaseous promoter from the group of gases comprising hydrogen sulfide, ammonia, ammonium polysulfide, and a mixture of hydrogen sulfide and water vapor.

11. The process of claim 1 wherein the gaseous fluorinating agent comprises gaseous fluorine or a halofluoride gas.

12. The process of claim 1 and including the step of collecting gaseous chemical values other than uranium or nickel values separately from the uranium and nickel values.

13. The process of claim 1 and including the step of repeating the steps of claim 1 following the withdrawal of nickel values.

14. The process of claim 1 wherein the gaseous fluorinating agent is adjusted to a temperature of between about 15° C. and about 65° C. when the gaseous fluorinating agent is presented to a uranium value.

15. The process of claim 1 and including the step of continuously circulating the gaseous fluorinating agent past uranium-containing deposits exposed on the surfaces of the item of process equipment to develop a flowing gas stream containing the mixture of the gaseous fluorinating agent and uranium hexafluoride gas.

16. The process of claim 15 and including the steps of circulating the flowing gas stream through a treatment loop disposed remote from the item of process equipment, and within the treatment loop, and extracting at least a portion of the uranium hexafluoride from the flowing gas stream.

17. The process of claim 15 wherein the temperature of the flowing gas stream when the gas stream is disposed within the item of process equipment is maintained at a level which assures that the partial pressure of any uranium hexafluoride contained within the flowing gas stream is below that partial pressure at which the uranium hexafluoride will desubliminate within the item of process equipment.

18. A process for the recovery of metallic nickel from an item having metallic nickel exposed on the surface thereof comprising disposing the item having metallic nickel exposed on the surface thereof in a closed reaction vessel, circulating through the reaction vessel a mixture of gaseous carbon monoxide and a gaseous promoter, at subatmospheric pressure and at a temperature less than the temperature at which nickel carbonyl decomposes, to convert the nickel exposed on the surface of the item to gaseous nickel carbonyl to develop a flowing gas stream containing carbon monoxide, gaseous promoter and nickel carbonyl, continuously withdrawing at least a portion of the flowing gas stream from the reaction vessel, and continuously converting at least a portion of the nickel carbonyl in the flowing gas stream which is withdrawn from the vessel to metallic nickel.

19. The process of claim 18 and including the step of returning the flowing gas stream to the reaction vessel following the conversion of at least a portion of the nickel carbonyl in the flowing gas stream to metallic nickel.

20. The process of claim 18 and including the step of adding to the flowing gas stream additional gaseous carbon monoxide.

21. The process of claim 18 and including the step of adding to the flowing gas steam an additional gaseous promoter.

22. The process of claim 18 and including the step of selecting the gaseous promoter from the group of gases including hydrogen sulfide, carbonyl sulfide, ammonia, ammonium polysulfide and a mixture of hydrogen sulfide and water vapor.

23. A process for the in situ recovery of uranium and nickel values from one or more items of process equipment theretofore employed in a uranium hexafluoride isotope enrichment gaseous diffusion plant employing the steps of conditioning an item of process equipment in situ to ensure its freedom from undesirable chemical values, subjecting said conditioned item of process equipment to a quantity of a gaseous fluorinating agent that is capable of converting uranium oxide and/or uranyl fluoride to gaseous uranium hexafluoride at a temperature not greater than about 65° C., and at subatmospheric pressure, for a time sufficient to convert uranium compounds disposed on the surfaces of the item of process equipment to gaseous uranium hexafluoride, withdrawing and capturing said uranium hexafluoride, thereafter, subjecting said item of process equipment to a quantity of a mixture of gaseous carbon monoxide and a gaseous promoter, at subatmospheric pressure, and a temperature less than the temperature at which nickel carbonyl decomposes, for a time sufficient to convert metallic nickel exposed on the outer surfaces of the item of process equipment to gaseous nickel carbonyl, withdrawing said gaseous nickel carbonyl, and converting said gaseous nickel carbonyl to metallic nickel.

24. The process of claim 23 wherein the gaseous fluorinating agent comprises gaseous fluorine or a halo-fluoride gas.

25. The process of claim 23 wherein the gaseous fluorinating agent comprises gaseous chlorine trifluoride.

26. The process of claim 23 wherein the gaseous promoter comprises gaseous hydrogen sulfide.

27. The process of claim 23 wherein the items of process equipment comprise the process equipment included in a preexisting cell of a cascade for the isotope enrichment of uranium hexafluoride.

28. The process of claim 23 and including the step of maintaining the temperature of the gaseous fluorinating agent at a temperature between about 15° C. and about 65° C.

29. The process of claim 23 and including the step of maintaining the temperature of the mixture of carbon monoxide and gaseous promoter, during the time in which the mixture of gas is in position to convert metallic nickel exposed on the surfaces of the item of process equipment to gaseous nickel carbonyl, at a temperature less than the temperature at which the pressure developed by the mixture of gaseous carbon monoxide, gaseous promoter and gaseous nickel carbonyl is no longer subatmospheric.

30. The process of claim 23 and including the step of continuously circulating the mixture of carbon monoxide and gaseous promoter past metallic nickel exposed on the surfaces of the item of process equipment to develop a flowing gas stream containing the mixture of carbon monoxide and gaseous promoter and gaseous nickel carbonyl.

31. The process of claim 30 and including the steps of circulating the flowing gas stream through a treatment loop disposed remote from the item of process equipment, and within the treatment loop, converting nickel carbonyl in the flowing gas stream to metallic nickel.

32. The process of claim 23 and including the step of selecting the gaseous fluorinating agent from the group of gases comprising chlorine trifluoride, bromine trifluoride, iodine heptafluoride, and dioxygen difluoride.

33. The process of claim 23 and including the step of selecting the gaseous promoter from the group of gases comprising hydrogen sulfide, ammonia, ammonium polysulfide, and a mixture of hydrogen sulfide and water vapor.

34. The process of claim 23 and including the step of collecting gaseous chemical values other than uranium or nickel values separately from the uranium and nickel values.

35. The process of claim 23 and including the step of repeating the steps of claim 1 following the withdrawal of nickel values.

* * * * *